United States Patent
Cloft et al.

(10) Patent No.: US 10,641,181 B2
(45) Date of Patent: May 5, 2020

(54) GAS TURBINE ENGINE ACCESSORY GEARBOX

(71) Applicant: United Technologies Corporation, Hartford, CT (US)

(72) Inventors: Thomas G. Cloft, Glastonbury, CT (US); Robert L. Gukeisen, Middletown, CT (US); Claude Mercier, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 1043 days.

(21) Appl. No.: 14/764,105

(22) PCT Filed: Jan. 30, 2013

(86) PCT No.: PCT/US2013/023713
§ 371 (c)(1),
(2) Date: Jul. 28, 2015

(87) PCT Pub. No.: WO2014/120134
PCT Pub. Date: Aug. 7, 2014

(65) Prior Publication Data
US 2016/0010561 A1 Jan. 14, 2016

(51) Int. Cl.
*F02C 7/32* (2006.01)
*F02C 3/04* (2006.01)
*B64D 29/06* (2006.01)

(52) U.S. Cl.
CPC ............... *F02C 7/32* (2013.01); *B64D 29/06* (2013.01); *F02C 3/04* (2013.01); *F05D 2250/313* (2013.01); *F05D 2250/75* (2013.01)

(58) Field of Classification Search
CPC ... B64D 29/06; F02C 3/04; F02C 7/06; F02C 7/32; F02C 7/36; F05D 2250/313; F05D 2250/75
(Continued)

(56) References Cited

U.S. PATENT DOCUMENTS 3,799,476 A * 3/1974 Bouiller ................. B64D 41/00
244/53 R
5,694,765 A 12/1997 Hield et al.
(Continued)

FOREIGN PATENT DOCUMENTS

DE 1938299 7/1972
EP 2112352 10/2009
(Continued)

OTHER PUBLICATIONS

International Search Report and Written Opinion for Application No. PCT/US2013/023713 dated Mar. 28, 2013.
(Continued)

*Primary Examiner* — Thai Ba Trieu
*Assistant Examiner* — Dapinder Singh
(74) *Attorney, Agent, or Firm* — Carlson, Gaskey & Olds, P.C.

(57) ABSTRACT

An example gas turbine engine includes, among other things, a nacelle having an inner wall providing a bypass duct of a gas turbine engine, and an outer wall; an accessory gearbox is received between the inner wall and the outer wall of the nacelle; and an accessory drive of the accessory gearbox is configured to rotate about an accessory drive axis that is transverse to a central axis of the gas turbine engine.

18 Claims, 7 Drawing Sheets

(58) Field of Classification Search
USPC .............................. 415/1, 122.1, 144, 214.1
See application file for complete search history.

(56) References Cited

U.S. PATENT DOCUMENTS

| | | | |
|---|---|---|---|
| 7,055,330 | B2 | 6/2006 | Miller |
| 7,386,983 | B2 | 6/2008 | Miller |
| 8,511,967 | B2* | 8/2013 | Suciu ..................... F01D 25/18 415/108 |
| 8,943,840 | B2* | 2/2015 | Williams ............... B21D 53/50 60/796 |
| 8,973,465 | B2* | 3/2015 | Duong ................... F16H 1/222 60/802 |
| 9,121,351 | B2* | 9/2015 | Ress, Jr. .................. F02C 7/32 |
| 9,145,834 | B2* | 9/2015 | Frost ........................ F02C 7/32 |
| 9,217,374 | B2* | 12/2015 | Beier ..................... F01D 25/20 |
| 2009/0188334 | A1 | 7/2009 | Merry et al. |
| 2009/0223052 | A1 | 9/2009 | Chaudhry et al. |
| 2009/0290976 | A1 | 11/2009 | Suciu et al. |
| 2011/0252807 | A1* | 10/2011 | Huang ................... B64D 41/00 60/788 |
| 2011/0289936 | A1* | 12/2011 | Suciu ....................... F02C 7/32 60/802 |
| 2012/0117981 | A1* | 5/2012 | Suciu ....................... F02C 7/32 60/802 |
| 2012/0237334 | A1 | 9/2012 | McCune et al. |
| 2012/0317991 | A1* | 12/2012 | Frost ....................... F02C 7/32 60/784 |
| 2013/0180262 | A1* | 7/2013 | Duong ..................... F02C 7/32 60/802 |

FOREIGN PATENT DOCUMENTS

| | | |
|---|---|---|
| EP | 2522832 | 11/2012 |
| WO | 2014052558 | 4/2014 |

OTHER PUBLICATIONS

U.S. Appl. No. 13/719,303, filed Dec. 19, 2012.
Supplementary European Search Report for Application No. 13873764.8 dated Aug. 25, 2016.
International Preliminary Report on Patentability for PCT Application No. PCT/US2013/023713, dated Aug. 13, 2015.

* cited by examiner

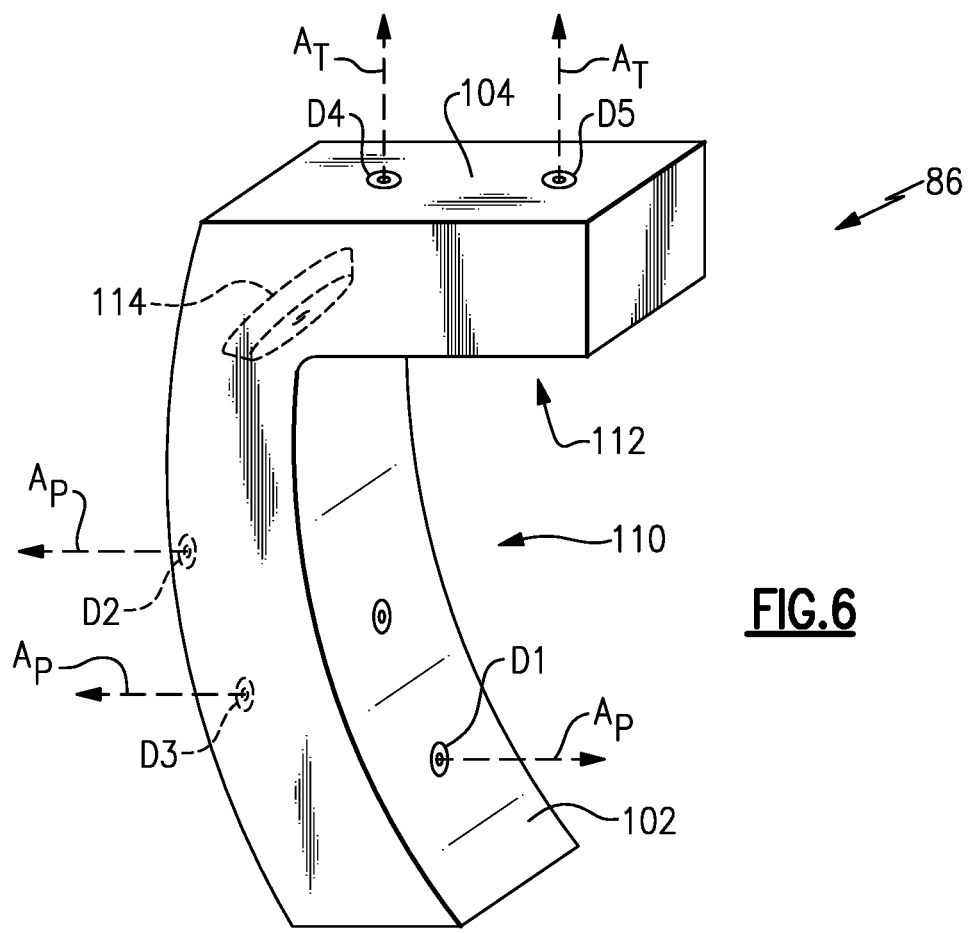
FIG.6
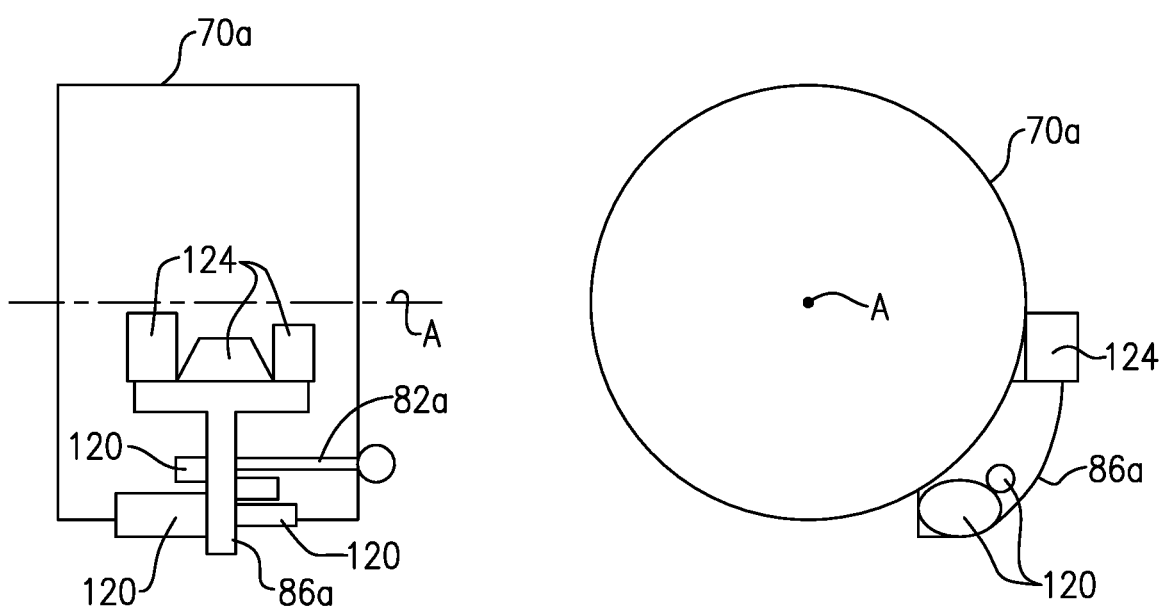
FIG.7
FIG.8

GAS TURBINE ENGINE ACCESSORY GEARBOX

BACKGROUND

This disclosure relates generally to an accessory gearbox and, more particularly, to mounting and placement of an accessory gearbox.

Turbomachines, such as gas turbine engines, typically include a fan section, a compression section, a combustion section, and a turbine section. Gas turbine engines may employ a geared architecture connecting portions of the compression section to the fan section.

Gas turbine engines often include an accessory gearbox that is utilized to rotatably drive various accessories. Packaging the accessory gearbox and the accessories is difficult. It is especially difficult to package the accessory gearbox and accessories associated with gas turbine engines having geared fan-drive architectures. These gas turbine engines typically have a shorter overall axial length than other types of gas turbine engines. Some conventional accessory gearboxes are located near the aft of the engine and require a relatively long driveshaft from the compressor. Placing the accessory gearbox in this area exposes the accessory gearbox to relatively high temperatures. Some conventional accessory gearboxes are mounted to a fan case of the engine.

SUMMARY

A gas turbine engine according to an exemplary aspect of the present disclosure includes, among other things, a nacelle having an inner wall providing a bypass duct of a gas turbine engine, and an outer wall; an accessory gearbox is received between the inner wall and the outer wall of the nacelle; and an accessory drive of the accessory gearbox is configured to rotate about an accessory drive axis that is transverse to a central axis of the gas turbine engine.

In a further non-limiting embodiment of the foregoing gas turbine engine, an oil pump may be rotatably coupled to the accessory drive.

In a further non-limiting embodiment of either of the foregoing gas turbine engines, a hydraulic pump may be rotatably coupled to the accessory drive.

In a further non-limiting embodiment of any of the foregoing gas turbine engines, a driveshaft may extend through the inner wall, the driveshaft to be connected to the gas turbine engine. The driveshaft and the accessory gearbox circumferentially overlap relative to the central axis.

In a further non-limiting embodiment of any of the foregoing gas turbine engines, the driveshaft may be positioned circumferentially between a four o'clock and a five o'clock position.

In a further non-limiting embodiment of any of the foregoing gas turbine engines, a bevel gear may rotatably couple rotation of the driveshaft with the accessory drive.

In a further non-limiting embodiment of either of the foregoing gas turbine engines, the gearbox may be received axially between an upstream end and a downstream end of the nacelle.

In a further non-limiting embodiment of either of the foregoing gas turbine engines, the accessory drive axis may extend tangentially relative to the nacelle.

In a further non-limiting embodiment of either of the foregoing gas turbine engines, the accessory drive axis may be perpendicular to the central axis.

In a further non-limiting embodiment of any of the foregoing gas turbine engines, the accessory drive is a first accessory drive, and the gas turbine engine further includes at least one second accessory drive of the gearbox, the at least one second accessory drive may be configured to rotate about a respective accessory drive axis that is aligned with the central axis.

In a further non-limiting embodiment of any of the foregoing gas turbine engines, the first accessory drive may be downstream from the at least one second accessory drive relative to a direction of flow through the gas turbine engine.

In a further non-limiting embodiment of any of the foregoing gas turbine engines, a third accessory drive may be configured to rotate about an axis that is upstream from the at least one accessory drive relative to a direction of flow through the gas turbine engine.

In a further non-limiting embodiment of any of the foregoing gas turbine engines, the accessory gearbox may have a "T" shaped configuration and the accessory drive is a first accessory drive, the gas turbine engine further includes at least one second accessory drive of the gearbox, the at least one second accessory drive may be configured to rotate about a respective accessory drive axis that is aligned with the central axis, the first accessory drive may be upstream from at least one second accessory drive.

In a further non-limiting embodiment of either of the foregoing gas turbine engines, the accessory gearbox may have a "I" shaped configuration and the accessory drive is a first accessory drive, and the gas turbine engine may include at least one second accessory drive of the gearbox configured to rotate about a respective accessory drive axis that is transverse with the central axis, the first and second accessory drives engaging opposing sides of the accessory gearbox.

A gas turbine engine according to another exemplary aspect of the present disclosure includes, among other things, a fan, a compressor section, a combustor section, and a turbine section, the turbine section is configured to drive a shaft to rotatably drive the fan and the compressor, at least one driveshaft to be connected for rotation with the turbine section; an accessory gearbox is configured to rotatably drive an accessory at a drive location on a circumferentially facing side of the accessory gearbox; and a nacelle having an inner wall defining a bypass duct receiving bypass air from the fan, and an outer wall, the at least one driveshaft extending through the inner wall, and being connected to drive the accessory gearbox received between the inner and outer walls of the nacelle.

In a further non-limiting embodiment of the foregoing gas turbine engine, the accessory drive axis may be perpendicular to the central axis.

In a further non-limiting embodiment of the foregoing gas turbine engine, the driveshaft is configured to rotate about a radially extending driveshaft axis, and the accessory drive axis is perpendicular to the driveshaft axis.

In a further non-limiting embodiment of the foregoing gas turbine engine, the drive location may be a first drive location, and the gearbox includes a second drive location on the circumferentially facing side of the accessory gearbox, and at least one third drive location on an axially facing side of the accessory gearbox, the first drive location downstream from the third drive location and the second drive location upstream from the third drive location relative to a direction of flow through the gas turbine engine.

A method of providing a gearbox drive location within a gas turbine engine according to another exemplary aspect of the present disclosure includes, among other things, providing a nacelle having an inner wall defining a bypass duct of a gas turbine engine, and an outer wall; providing an accessory gearbox between the inner wall and the outer wall of the nacelle; and providing an accessory drive location from the accessory gearbox, the accessory drive location configured to rotate about an accessory drive axis that is transverse to a central axis of the gas turbine engine.

In a further non-limiting embodiment of the foregoing method of providing a gearbox drive location within a gas turbine engine, the method may include providing another accessory drive location from the accessory gearbox that is configured to rotate about an accessory drive axis aligned with the central axis of the gas turbine engine.

Although the different examples have the specific components shown in the illustrations, embodiments of this disclosure are not limited to those particular combinations. It is possible to use some of the components or features from one of the examples in combination with features or components from another one of the examples.

DESCRIPTION OF THE FIGURES

The various features and advantages of the disclosed examples will become apparent to those skilled in the art from the detailed description. The figures that accompany the detailed description can be briefly described as follows:

FIG. 6 is a perspective view of an accessory gearbox for use with the gas turbine engine of FIG. 3.

FIG. 7 shows a highly schematic view of another example accessory gearbox.

FIG. 8 shows a front view of FIG. 7.

DETAILED DESCRIPTION

Figure 1:
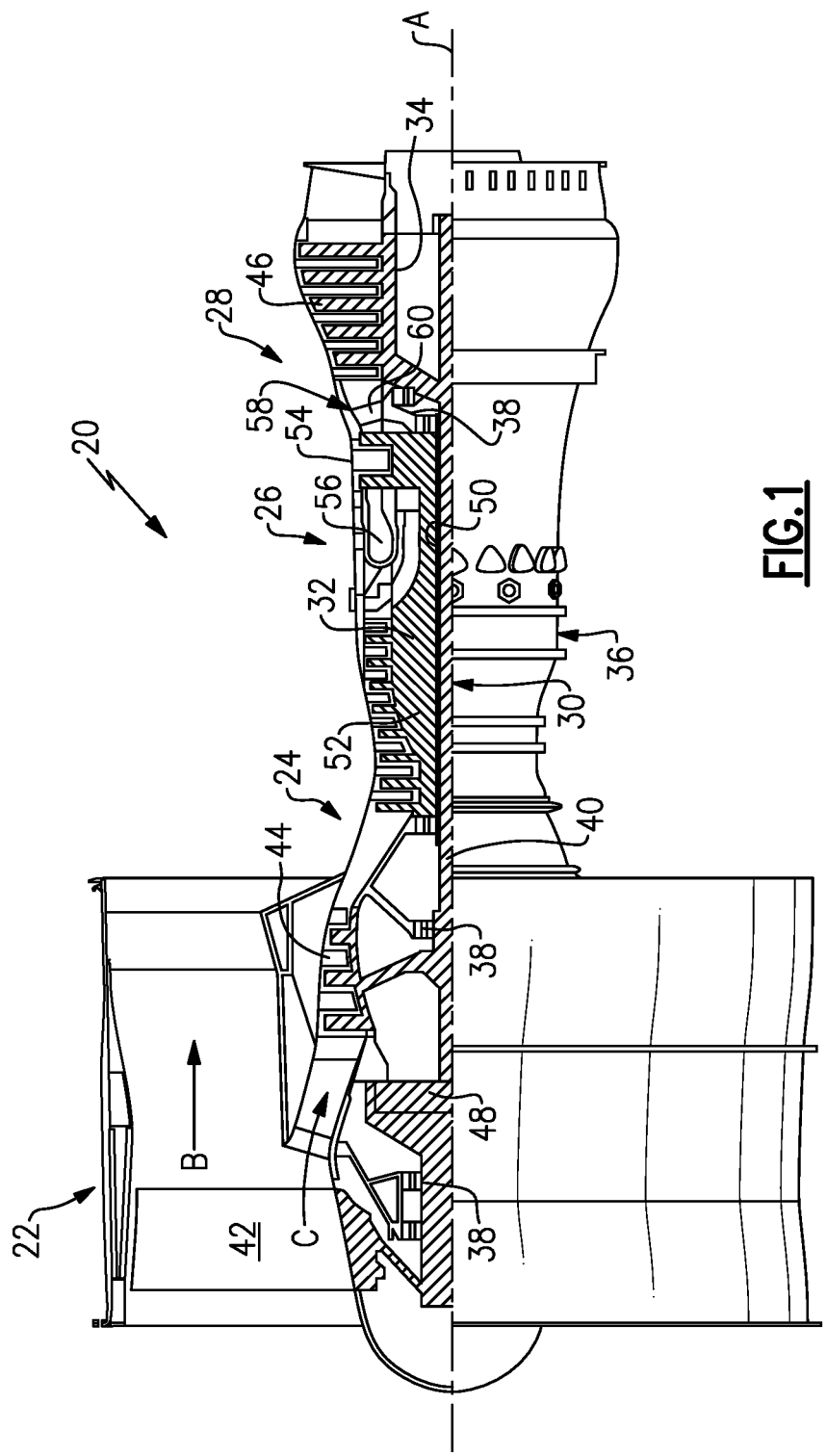
FIG. 1 shows a cross-section view of an example gas turbine engine.
Figure 2:
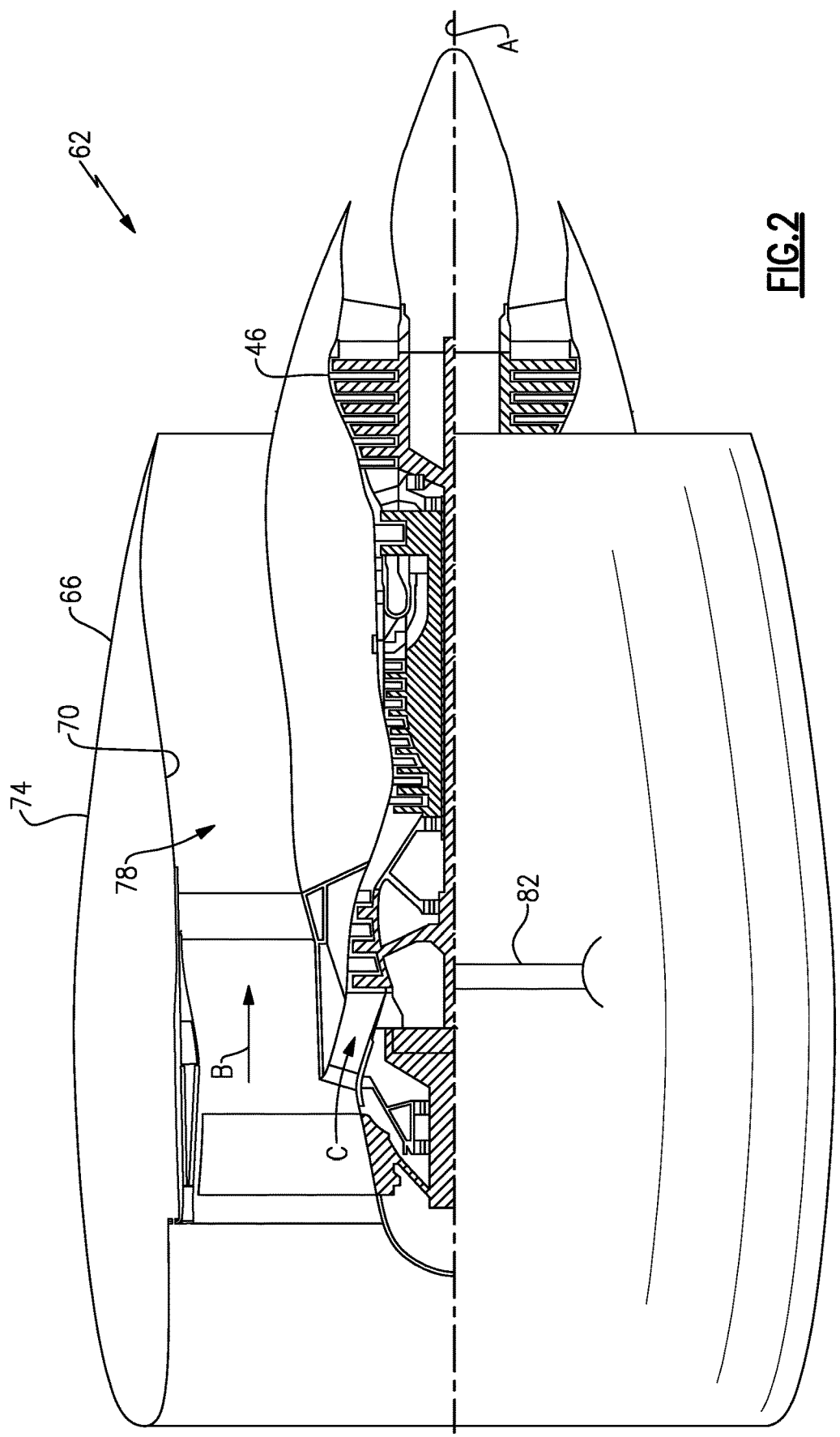
FIG. 2 shows a variation of the gas turbine engine of FIG. 1 received within a nacelle.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°R)]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Referring now to FIGS. 2-6, an engine 62 is a variation of the engine 20 of FIG. 1. The engine 62 is received within a nacelle assembly 66 between an upstream end and a downstream end of the nacelle 66. The nacelle 66 includes an inner wall 70 and an outer wall 74. The inner wall 70 defines an outer perimeter of a bypass duct 78. A fan case of the engine 62 may form a portion of the inner wall 70. The outer wall 74 is secured to a pylon to hold the engine 62. The pylon 76 extends from an aircraft wing.

A takeoff or driveshaft 82 is driven by the low pressure turbine 46 of the engine 62. The driveshaft 82 extends radially through the inner wall 70 to an accessory gearbox 86. The accessory gearbox 86 is mounted within the nacelle 66 between the inner wall 70 and outer wall 74.

Figure 3:
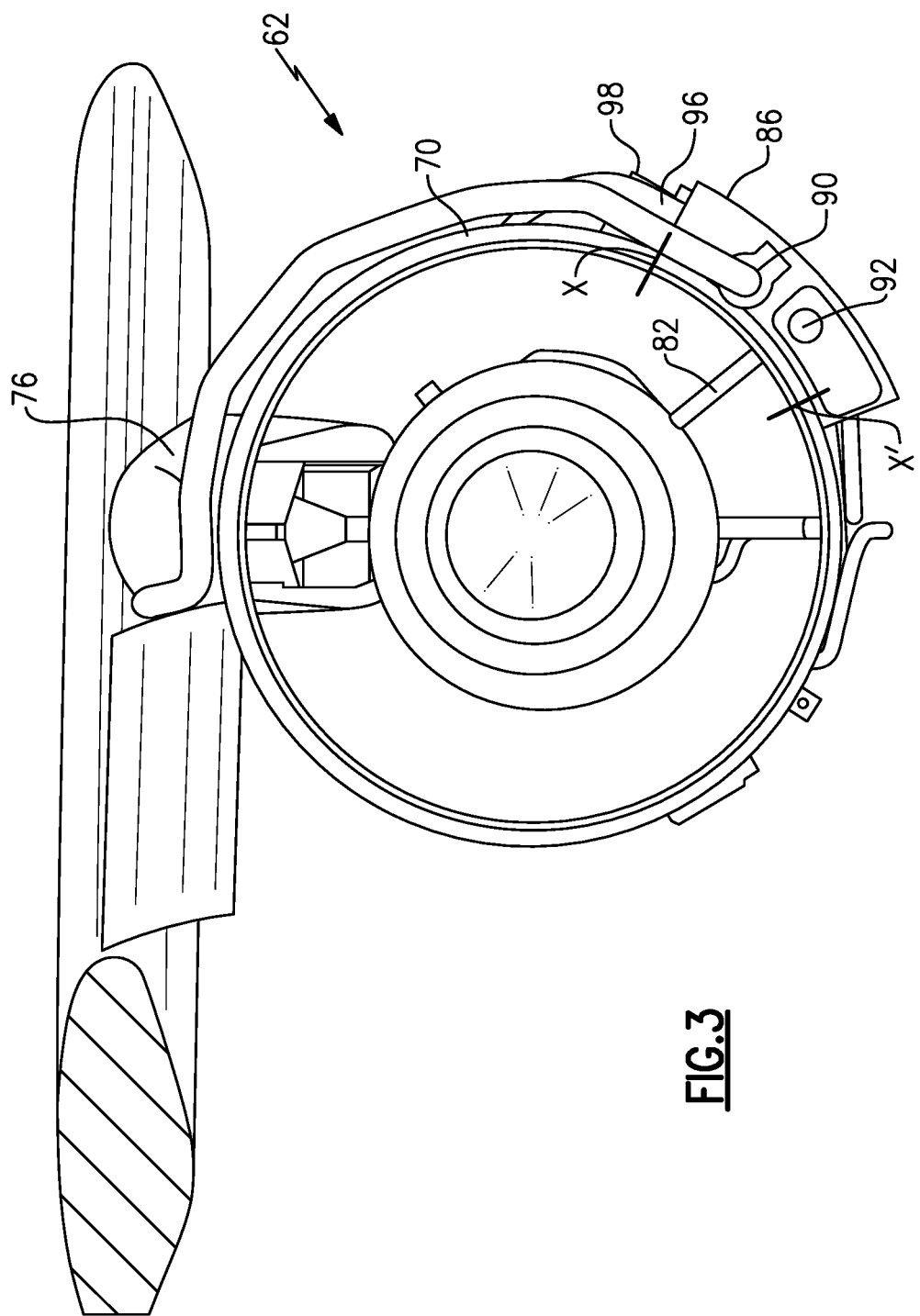
FIG. 3 shows a front view of the gas turbine engine of FIG. 2 mounted to an aircraft wing and having selected portions removed for clarity.
Figure 4:
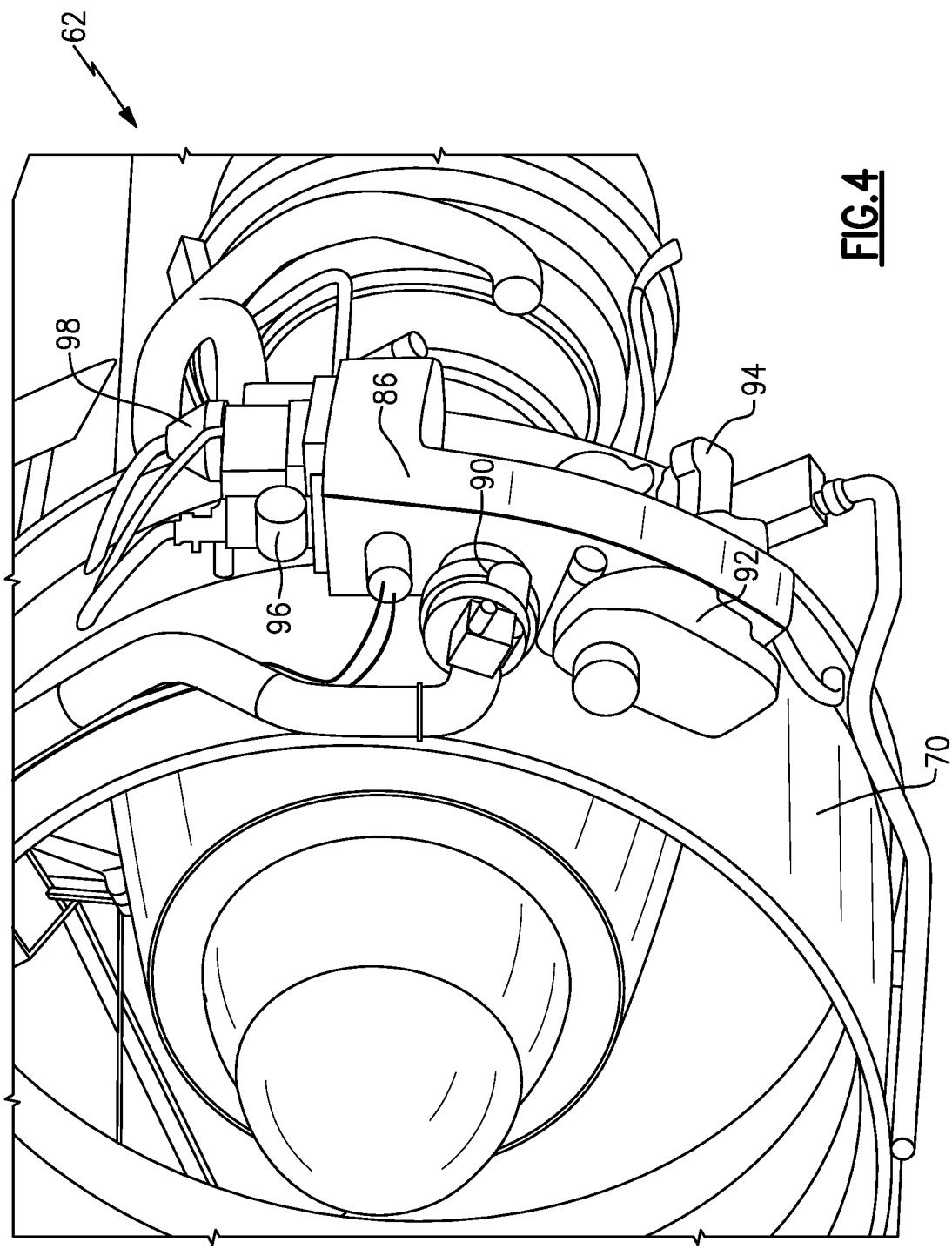
FIG. 4 shows a perspective view of the gas turbine engine of FIG. 3 looking aft.
Figure 5:
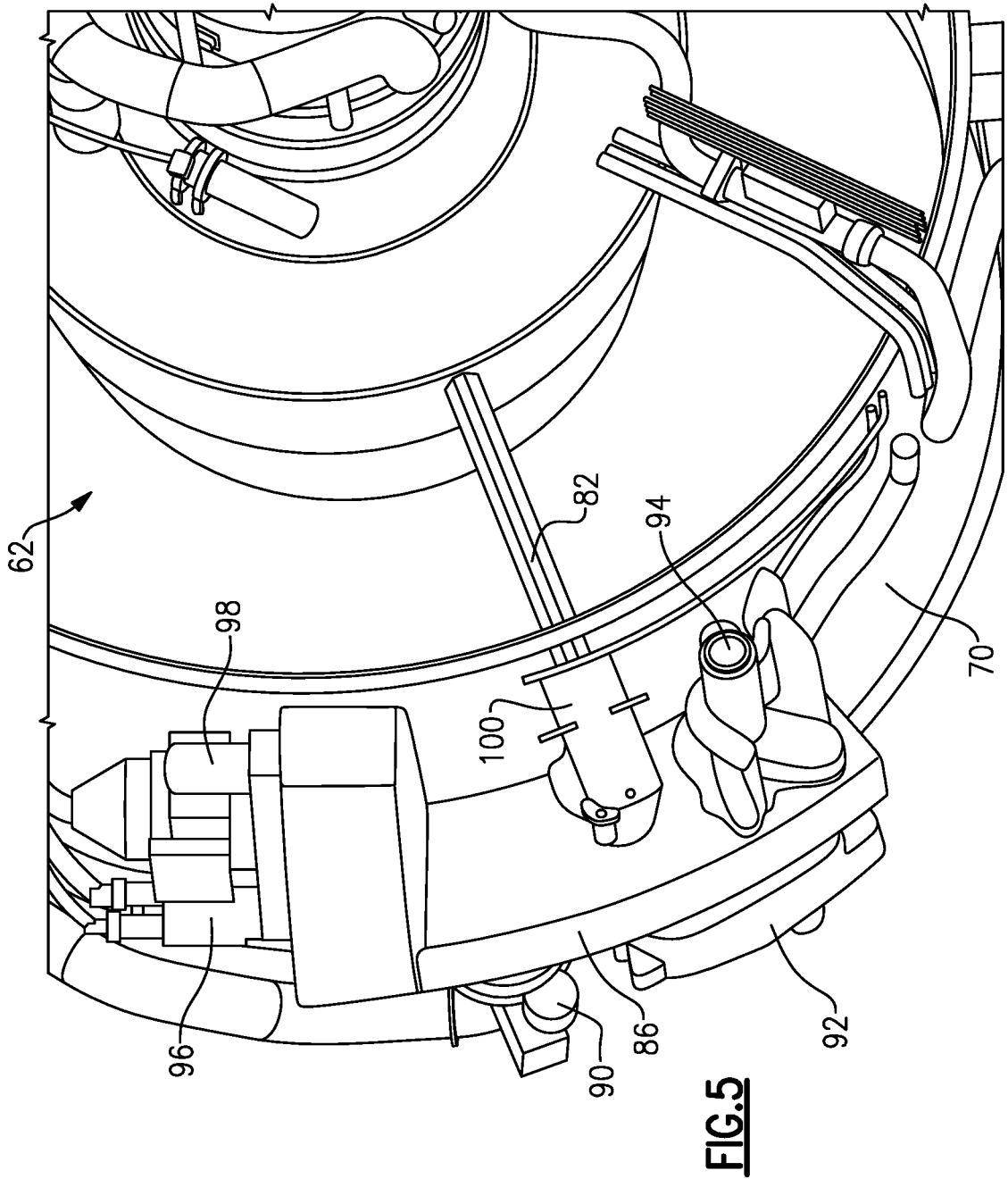
FIG. 5 shows a perspective view of the gas turbine engine of FIG. 3 looking forward.

During operation, the driveshaft 82 rotatably drives a geartrain of the gearbox 86. The gearbox 86 takes in rotation from the driveshaft 82 and rotatably drives several accessories, such as a starter 90, an aircraft generator 92, a fuel pump 94, a hydraulic pump 96, and an engine oil pump 98. The example driveshaft 82 extends radially at a circumferential position between a four o'clock position X and five o'clock position X' (FIG. 3).

A transfer gearbox 100 rotatably couples the driveshaft 82 to the geartrain within the gearbox 86. (For clarity, the entire geartrain is not shown.) The geartrain utilizes rotation from the transfer gearbox 100 to rotatably drive the accessories via one of five accessory drives D1-D5. The transfer gearbox 100 circumferentially overlaps with at least a portion of the gearbox 86.

Notably, the first, second, and third accessory drives D1-D3 rotate about accessory drive axises $A_P$ that are aligned with the central axis A of the engine 62. By contrast, the fourth and fifth accessory drives D4 and D5 rotate about respective accessory drive axises $A_T$ that are transverse to the central axis A. The axises $A_T$ of the fourth and fifth accessory drives D4 and D5, in this example, are tangential to the nacelle 66. In some examples, the axises $A_P$ are parallel to the central axis A, and the axises $A_T$ are perpendicular to the central axis A.

The starter 90, aircraft generator 92, and the fuel pump 94 engage axially facing sides 102 of the gearbox 86. The hydraulic pump 96 and engine oil pump 98 engage a circumferentially facing surface 104 of the gearbox. The differences in the orientation of the axises $A_P$ and $A_T$ is, in part, due to where the accessories engage the gearbox 86.

The accessory gearbox 86 has a circumferentially extending portion 110 and an axially extending portion 112. These portions provide sufficient surface area for mounting the various accessories.

A bevel gear 114 may form a portion of the geartrain within the gearbox 86. The bevel gear 114 is utilized to transfer rotation about axises aligned with the central axis A to rotation about the axises transverse to the central axis A.

In this example, the first, second, and third accessory drives D1-D3 are upstream from the fifth accessory drive D5 relative to a direction of flow through the engine 62.

Referring to FIGS. 7 and 8, another example gearbox 86a is secured near an inner wall 70a of a nacelle. The gearbox 86a may include various accessories 120 and 124 driven via rotation from a driveshaft 82a. Some of the accessories 120 are coupled to accessory drives that rotate about axises aligned with the central axis A. Other accessories 124 are coupled to drive locations that rotate about axises transverse to the central axis A. The gearbox 86a has a "T" shaped configuration to accommodate such a geartrain and layout of accessories.

Figure 9:
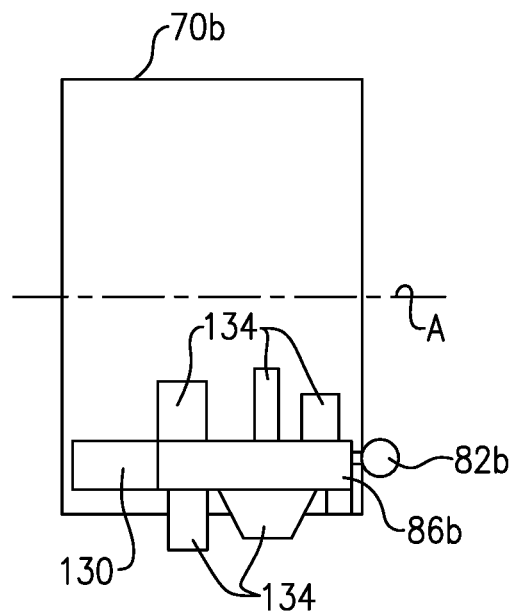
FIG. 9 shows a highly schematic view of yet another example accessory gearbox.
Figure 10:
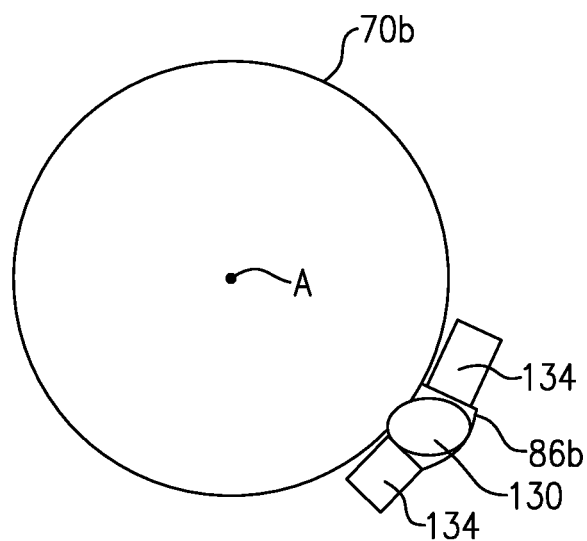
FIG. 10 shows a front view of FIG. 9.

Referring to FIGS. 9 and 10, another example gearbox 86b is secured near an inner wall 70b of a nacelle. The gearbox 86b may include various accessories 130 and 134 driven via rotation from a driveshaft 82b. Some of the accessories 130 are coupled to accessory drives that rotate about axises aligned with the central axis A. Other accessories 134 are coupled to drive locations that rotate about axises transverse to the central axis A. Accessories 134 engage opposing sides of the gearbox 86b. The gearbox 86b has an "I" shaped configuration to accommodate such a geartrain and layout of accessories.

Features of the disclosed examples include gearboxes that are mounted within a nacelle and have various configurations to accommodate various packaging requirements and desires.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A gas turbine engine, comprising:
a nacelle having an inner wall providing a bypass duct of a gas turbine engine, and an outer wall;
an accessory gearbox being received between the inner wall and the outer wall of the nacelle, the accessory gearbox having a circumferentially extending portion and an axially extending portion; and
an accessory drive of the accessory gearbox, the accessory drive configured to rotate about an accessory drive axis that extends tangentially relative to the nacelle.

2. The gas turbine engine of claim 1, including an oil pump rotatably coupled to the accessory drive.

3. The gas turbine engine of claim 1, including a hydraulic pump rotatably coupled to the accessory drive.

4. The gas turbine engine of claim 1, including a driveshaft extending through the inner wall, the driveshaft to be connected to the gas turbine engine, wherein the driveshaft and the accessory gearbox circumferentially overlap relative to a central axis of the gas turbine engine.

5. The gas turbine engine of claim 4, wherein the driveshaft is positioned circumferentially between a four o'clock and a five o'clock position.

6. The gas turbine engine of claim 4, including a bevel gear rotatably coupling rotation of the driveshaft with the accessory drive.

7. The gas turbine engine of claim 1, wherein the gearbox is received axially between an upstream end and a downstream end of the nacelle.

8. The gas turbine engine of claim 1, wherein the accessory drive is a first accessory drive, and including at least one second accessory drive of the gearbox, the at least one second accessory drive configured to rotate about a respective accessory drive axis that is aligned with a central axis of the gas turbine engine.

9. The gas turbine engine of claim 8, wherein the first accessory drive is downstream from the at least one second accessory drive relative to a direction of flow through the gas turbine engine.

10. The gas turbine engine of claim 9, including a third accessory drive configured to rotate about an axis that is upstream from the at least one accessory drive relative to a direction of flow through the gas turbine engine.

11. The gas turbine engine of claim 1, wherein the accessory gearbox has a "T" shaped configuration and the accessory drive is a first accessory drive, and including at least one second accessory drive of the gearbox, the at least one second accessory drive configured to rotate about a respective accessory drive axis that is aligned with a central axis of the gas turbine engine, the first accessory drive upstream from at least one second accessory drive.

12. The gas turbine engine of claim 1, wherein the accessory gearbox has a "T" shaped configuration and the accessory drive is a first accessory drive, and including at least one second accessory drive of the gearbox configured to rotate about a respective accessory drive axis that is transverse with a central axis of the gas turbine engine, the first and second accessory drives engaging opposing sides of the accessory gearbox.

13. A gas turbine engine comprising:
a fan, a compressor section, a combustor section, and a turbine section, the turbine section configured to drive a shaft to rotatably drive the fan and the compressor, at least one driveshaft to be connected for rotation with the turbine section;
an accessory gearbox configured to rotatably drive an accessory at a drive location on a circumferentially facing side of the accessory gearbox, the accessory gearbox having a circumferentially extending portion and an axially extending portion; and
a nacelle having an inner wall defining a bypass duct receiving bypass air from the fan, and an outer wall, the at least one driveshaft extending through the inner wall, and being connected to drive the accessory gearbox received between the inner and outer walls of the nacelle.

14. The gas turbine engine of claim 13, wherein the accessory drive axis is perpendicular to the central axis.

15. The gas turbine engine of claim 14, wherein the driveshaft is configured to rotate about a radially extending driveshaft axis, and the accessory drive axis is perpendicular to the driveshaft axis.

16. The gas turbine engine of claim 14, wherein the drive location is a first drive location, and the gearbox includes a second drive location on the circumferentially facing side of the accessory gearbox, and at least one third drive location on an axially facing side of the accessory gearbox, the first drive location downstream from the third drive location and the second drive location upstream from the third drive location relative to a direction of flow through the gas turbine engine.

17. A method of providing a gearbox drive location within a gas turbine engine, comprising:
providing a nacelle having an inner wall defining a bypass duct of a gas turbine engine, and an outer wall;
providing an accessory gearbox between the inner wall and the outer wall of the nacelle the accessory gearbox having a circumferentially extending portion and an axially extending portion; and
providing an accessory drive location from the accessory gearbox, the accessory drive location configured to rotate about an accessory drive axis that extends tangentially relative to the nacelle.

18. The method of claim 17, including providing another accessory drive location from the accessory gearbox that is configured to rotate about an accessory drive axis aligned with a central axis of the gas turbine engine.

* * * * *